United States Patent
Friedmann et al.

(10) Patent No.: US 7,967,122 B2
(45) Date of Patent: Jun. 28, 2011

(54) TORQUE TRANSMISSION DEVICE

(75) Inventors: Oswald Friedmann, Lichtenau (DE);
Rolf Meinhard, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 12/079,319

(22) Filed: Mar. 27, 2008

(65) Prior Publication Data
US 2008/0230342 A1    Sep. 25, 2008

Related U.S. Application Data

(63) Continuation of application No. 11/208,454, filed on Aug. 20, 2005, now Pat. No. 7,686,147.

(30) Foreign Application Priority Data

Sep. 3, 2004  (DE) .................. 10 2004 042 640
Oct. 22, 2004  (DE) .................. 10 2004 051 476

(51) Int. Cl.
*F16D 21/06*  (2006.01)
*B60K 17/02*  (2006.01)

(52) U.S. Cl. .............. 192/48.8; 192/55.61; 192/70.13; 192/110 B; 192/110 S; 384/903

(58) Field of Classification Search .............. 192/48.8, 192/55.61, 70.13, 110 S; 384/903
See application file for complete search history.

(56) References Cited

U.S. PATENT DOCUMENTS

| | | | | |
|---|---|---|---|---|
| 3,185,274 | A | * | 5/1965 | Jean ............................ 192/48.8 |
| 5,123,511 | A | * | 6/1992 | Beccaris ..................... 192/70.13 |
| 6,276,832 | B1 | * | 8/2001 | Wade, III ...................... 384/204 |
| 6,401,897 | B1 | * | 6/2002 | Jackel et al. ............... 192/70.13 |
| 2002/0060118 | A1 | * | 5/2002 | Beneton et al. ............. 192/48.8 |
| 2003/0024788 | A1 | * | 2/2003 | Damm et al. ............. 192/48.91 |
| 2006/0021842 | A1 | * | 2/2006 | Berhan ........................ 192/48.8 |

FOREIGN PATENT DOCUMENTS

| | | | |
|---|---|---|---|
| EP | 1361102 A2 | * | 11/2003 |
| JP | 57061828 A | * | 4/1982 |

\* cited by examiner

*Primary Examiner* — Richard M. Lorence
(74) *Attorney, Agent, or Firm* — Alfred J. Mangels

(57) ABSTRACT

A torque transmitting device in a drive train of a motor vehicle to transmit torque between an internal combustion engine having a drive shaft and a transmission having coaxial input shafts. The transmission input shafts are each non-rotatably connected with a respective clutch disc having friction linings. An intermediate pressure plate is positioned between the friction linings of the clutch discs and is non-rotatably connected to the engine drive shaft. The friction linings of the clutch discs are between the intermediate pressure plate and respective axially movable clutch pressure plates that are actuated by an actuation device. To provide support for the double clutch unit the intermediate pressure plate is radially mounted on one of the two transmission input shafts.

8 Claims, 12 Drawing Sheets

TORQUE TRANSMISSION DEVICE

CROSS-REFERENCE TO RELATED APPLICATION

This application is a continuation of U.S. application Ser. No. 11/208,454, filed on Aug. 20, 2005, now U.S. Pat. No. 7,686,147 B2, which issued on Mar. 30, 2010.

BACKGROUND OF THE INVENTION

The present invention relates to a torque transmission device in the drive train of a motor vehicle to transmit torque between a drive unit, especially an internal combustion engine having a drive shaft, especially a crankshaft, and a transmission with at least two transmission input shafts that are tightly connected to a clutch disc having a friction lining. An intermediate pressure plate is positioned between the friction linings of one clutch disc and the friction linings of the other clutch disc and is tightly connected to the drive shaft of the drive unit. The friction linings of the clutch discs are between the intermediate pressure plate and outer pressure plates that move axially with the assistance of an actuation device, relative to the intermediate pressure plate, in reference to the transmission input shafts in order to hold the friction linings between the intermediate pressure plate and the outer pressure plates.

The two clutch disks and the interacting pressure plates form a double clutch. In conventional torque transmission devices with a double clutch, the double clutch bearing system is frequently complicated.

An object of the invention is to provide a torque transmission device by means of which the double clutch bearing system is improved.

SUMMARY OF THE INVENTION

The object is achieved in that an intermediate pressure plate is radially supported on at least one of the transmission input shafts of a torque transmission device in the drive train of a motor vehicle to transmit torque between a drive unit, especially an internal combustion engine having a drive shaft, especially a crankshaft, and a transmission with at least two transmission input shafts that are tightly connected to a clutch disc having a friction lining. The intermediate pressure plate is positioned between the friction lining of one clutch disc and the friction lining of the other clutch disc and is drivingly connected to the drive shaft of the drive unit. The friction linings of the clutch discs are between the intermediate pressure plate and the outer pressure plates that move axially with the assistance of an actuation device, relative to the intermediate pressure plate, in reference to the transmission input shafts, in order to hold the friction linings between the intermediate pressure plate and the outer pressure plates. That arrangement provides a rigid and compact bearing system for the double clutch. The intermediate pressure plate can be directly or indirectly supported on one of the transmission input shafts, for example via an essentially tubular hub.

One preferred exemplary embodiment of the torque transmission device is characterized in that the intermediate pressure plate is supported on one of the transmission input shafts by a bearing device (especially a radial bearing), especially on an internally hollow transmission input shaft within which an additional transmission input shaft is rotatably carried. The bearing can be, for example, a roller bearing or a journal bearing.

Another preferred exemplary embodiment of the torque transmission device is characterized in that one of the clutch discs is releasably affixed (i.e., removable without destroying it) to one of the transmission input shafts, especially on the additional transmission input shaft. The bearing for the intermediate pressure plate is, for example, a support bearing that is inserted onto a bearing seat on the hollow outer transmission input shaft during assembly of the double clutch and is axially secured with a snap ring. Then one of the clutch discs is affixed to the additional inner transmission input shaft.

Another preferred exemplary embodiment of the torque transmission device is characterized in that the clutch disc affixed to one of the transmission input shafts, especially to the additional inner transmission input shaft, has a two-part design. An engine-side input clutch disc affixed to the additional inner transmission input shaft prevents access to the snap ring. The two-part design makes it easier to access the bearing of the intermediate pressure plate.

Another preferred exemplary embodiment of the torque transmission device is characterized in that the clutch disc affixed to one of the transmission input shafts, especially to the additional inner transmission input shaft, has a hub from which an inner flanged ring extends that is releasably affixed, i.e., removable without destroying it, to an outer, flange-like ring on which the friction linings are radially outwardly positioned. The radially outer flange-like ring is preferably installed in the double clutch on the transmission side during assembly. The radially inner flange-like ring with the hub is loosely placed on the double clutch and is mounted only after installing the snap ring.

Another preferred exemplary embodiment of the torque transmission device is characterized in that the two flange-like rings are connected by at least one screw connection. The two flange-like parts are advantageously centered by means of a centering seat. The two flange-like rings can be interconnected with each other via a toothed connection, for example. Additionally, the two flange-like parts or flange-like rings can be releasably connected by at least one snap connection.

Another preferred exemplary embodiment of the torque transmission device is characterized in that one of the transmission input shafts is designed as a hollow shaft within which the additional inner transmission input shaft is rotatably mounted. An essentially tubular hub is rotatably mounted between the two transmission input shafts with a drive-side and a transmission-side end, and the intermediate pressure plate is affixed to the drive-side of the hub. It is preferably secured by rivets. The intermediate pressure plate can also be secured to the hub by flanging or with a centering seat with a snap ring.

Other preferred exemplary embodiments of the torque transmission device are characterized in that the transmission-side end of the hub within the hollow shaft is mounted in the hollow shaft, on the hollow shaft, or on the additional transmission input shaft. The bearing can be a roller bearing, preferably a needle bearing, or a journal bearing. For lubrication, the bearing can be connected with the oil chamber of the transmission, or with its own independently sealed grease lubrication system. The rigidity of the bearing is preferably such that the natural frequency of the relaxation oscillation relative to the first order lies above the driving mode.

Another preferred exemplary embodiment of the torque transmission device is characterized in that the intermediate pressure plate is supported in an axial direction on one of the transmission input shafts. The axial control forces of the double clutch are thereby no longer transmitted to the crankshaft.

Another preferred exemplary embodiment of the torque transmission device is characterized in that the double clutch is pre-assemblable in a clutch housing. The clutch housing is also termed the bell housing. The accessibility of the pre-assembly points is enabled by corresponding accesses in the drive-side clutch disc of the double clutch, for example.

Another preferred exemplary embodiment of the torque transmission device is characterized in that the bearing site of the pre-assembled double clutch is around or close to the center of gravity of the double clutch. That arrangement of the bearing site or bearing device of the intermediate pressure plate makes it easier to mount and transport the pre-assembled double clutch.

Another preferred exemplary embodiment of the torque transmission device is characterized in that one of the transmission input shafts is designed as a hollow shaft within which the additional inner transmission input shaft is rotatably mounted, whereby the intermediate pressure plate is mounted via a bearing device directly on one of the transmission input shafts, especially the additional inner transmission input shaft. An additional pilot bearing can be provided for the additional inner transmission input shaft in the drive shaft on the drive-side end of the additional inner transmission input shaft.

Another preferred exemplary embodiment of the torque transmission device is characterized in that one of the transmission input shafts is designed as a hollow shaft within which the additional inner transmission input shaft is rotatably mounted, whereby the intermediate pressure plate is mounted via a bearing device to a hub bearing that is releasably affixed, i.e., removable without destroying it, to the drive-side end of the additional inner transmission input shaft. The hub bearing is affixed using a screw that is screwed into a corresponding threaded hole in the drive-side end of the additional transmission input shaft, for example.

Another preferred exemplary embodiment of the torque transmission device is characterized in that one of the clutch discs is non-rotatably connected to the hub bearing. The hub bearing enables both clutch discs to have the same hub geometry. An additional pilot bearing can be provided for the additional transmission inner input shaft in the output shaft on the input-side end of the hub bearing.

Another preferred exemplary embodiment of the torque transmission device is characterized in that the bearing device includes a bearing outer race that is radially affixed to the inside of the intermediate pressure plate, and/or a bearing inner race that is radially affixed to the outside of the associated transmission input shaft. The bearing device is preferably designed as an angular contact ball bearing, for example a grooved ball bearing. The bearing outer race can also be integrated into the intermediate pressure plate. Roller bearings are disposed between the bearing outer race and bearing inner race in a familiar manner.

Another preferred exemplary embodiment of the torque transmission device is characterized in that the bearing inner race has a supporting section that is inserted radially inward onto one of the transmission input shafts, so that the transmission-side end of the bearing section lies on a step formed on the associated transmission input shaft. The support section essentially has the same shape as a circular cylinder barrel. Radially outwardly, the support section forms a contact surface for the roller bearings of the bearing device. Instead of the step, a snap ring can be axially affixed to the associated transmission input shaft.

Another preferred exemplary embodiment of the torque transmission device is characterized in that an attachment section extends from the input-side end of the support section, to which a retaining ring is releasably affixed (i.e., removable without destroying it). The attachment section extends in a substantially radial direction. The retention ring is preferably affixed by means of at least one screw connection to the attachment section.

Another preferred exemplary embodiment of the torque transmission device is characterized in that the retention ring is fixed with the aid of a screw connection to the attachment section of the bearing inner race. The screw connection is accessible during assembly, for example through a corresponding opening in the associated output-side clutch disc.

Another preferred exemplary embodiment of the torque transmission device is characterized in that the retention ring has a locating section radially on the inside that exerts a closing force on the locking ring, depending upon the status of the screw connection, and the force causes the locking ring to engage in an annular groove that is provided in the associated transmission input shaft. That makes it easy to axially affix the bearing device on the associated transmission input shaft.

Another preferred exemplary embodiment of the torque transmission device is characterized in that the locking ring is slotted and is so biased that it can be inserted onto the associated transmission input shaft. Only when the screw is tight is the biasing force of the locking ring overcome so that it is axially fixed in the annular groove.

Another preferred exemplary embodiment of the torque transmission device is characterized in that the bearing outer race, the bearing inner race, the retention ring, and/or the locking ring are made of sheet metal. That can reduce manufacturing costs.

Another preferred exemplary embodiment of the torque transmission device is characterized in that there is a torsional vibration damper between the output shaft of the drive unit and the double clutch, especially a dual-mass flywheel including a damper input part that is non-rotatably affixed to the output shaft of the drive unit, and a damper output part that is releasably attached (i.e., removable without destroying it) to a double clutch housing part to which the intermediate pressure plate is affixed. The releasable connection is preferably a form-locking, axial plug-in connection, especially with complementary teeth. The input part of the vibration damper is centered on the crankshaft. The double clutch is centered on one of the transmission shafts. Any offset in a radial direction can be at the contact site between the output part of the vibration damper and the energy storage mechanisms, especially bow springs of the vibration damper. The plug-in connection, preferably designed as a tooth arrangement, ensures sufficient axial mobility of the double clutch relative to the vibration damper. That makes assembly easier. The primary parts or input parts of the vibration damper can be pre-assembled on the crankshaft. In addition, axial vibrations of the crankshaft that arise during operation are not transmitted to the clutch.

Another preferred exemplary embodiment of the torque transmission device is characterized in that there is a spring device between the double clutch housing part and the damper output part; the spring device presses the damper output part against a friction/sliding device that is between the damper input part and the damper output part. The spring device is preferably a diaphragm spring. The friction/sliding device is either attached to the damper input part, or the damper output part.

Another preferred exemplary embodiment of the torque transmission device is characterized in that the damper output part has a recess to receive a section of the double clutch housing part on its inside radially within the friction/sliding device. That produces a stable, non-rotating connection between the parts connected by the plug-in connection.

Another preferred exemplary embodiment of the torque transmission device is characterized in that the double clutch housing part is made of sheet metal, and has a flanged region that serves to fasten the double clutch housing part to the intermediate pressure plate. The flanged region preferably has several feet with through-holes for fasteners, such as screws or rivets.

Another preferred exemplary embodiment of the torque transmission device is characterized in that the double clutch housing part has an external spline section that is designed as a single piece with the flanged region and is complementary to an internal spline that is provided radially inward on the damper output part. The complementary teeth easily provide a nonrotating plug-in connection between the double clutch housing part and the output part of the vibration damper.

Another preferred embodiment of the torque transmission device is characterized in that the section with the external teeth lies in a radial direction between the inner diameter and the outer diameter of the friction lining of the neighboring clutch disc. That arrangement has proven to be advantageous within the framework of the present invention.

Another preferred embodiment of the torque transmission device is characterized in that there is a reinforcing edge on the double clutch housing part radially within the external tooth region. Inner reinforcement can be alternately provided by inserting another part.

Another preferred exemplary embodiment of the torque transmission device is characterized in that the damper output part is essentially shaped like an annular disc made of sheet metal, on which there is a radial internal spline and at least one radial outside catch finger or arm that engages in an energy storage mechanism of the vibration damper. The internal spline can be continuous. The internal spline can also have sections without teeth to provide peripheral reinforcement and improve the deformation behavior of the double clutch housing part. The damper output part can have one or a plurality of parts.

Another preferred exemplary embodiment of the torque transmission device is characterized in that two catch fingers or catch arms are diametrically opposed radially on the outside of the damper output part. That ensures that the torsional vibration damper functions sufficiently.

Another preferred exemplary embodiment of the torque transmission device is characterized in that there are radial slots near the catch fingers in the damper output part. The slots serve to make the output part elastic. That makes it possible to bias the connection between the damper output part and the double clutch housing part when assembled.

BRIEF DESCRIPTION OF THE DRAWINGS

Additional advantages, features, and details of the invention are found in the following description in which various exemplary embodiments are described in detail with reference to the drawings. The features cited in the claims and in the description may be essential to the invention by themselves or in any combination thereof. The following is shown in the drawings:

DESCRIPTION OF THE PREFERRED EMBODIMENTS

Figure 1:
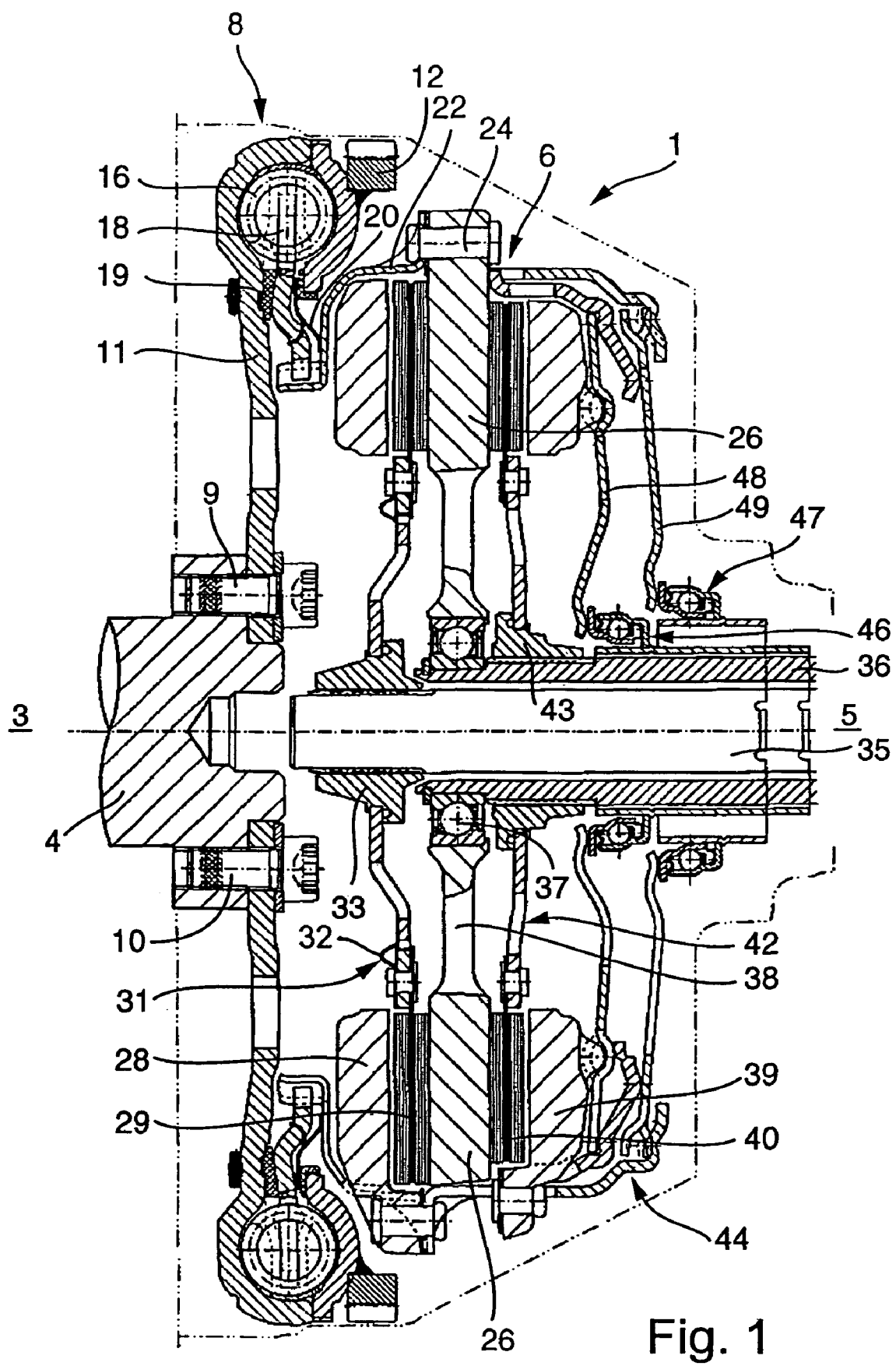
FIG. 1 is a longitudinal cross section of a torque transmission device with a two-part clutch disk.

FIG. 1 shows a part of a drive train 1 of a motor vehicle. A double clutch 6 is between a drive unit 3, especially an internal combustion engine, from which a crankshaft 4 extends, and a transmission 5. There is a vibration damper 8 between the drive unit 3 and the double clutch 6. The vibration damper 8 is a dual-mass flywheel.

The crankshaft 4 of the internal combustion engine 3 is firmly connected via screw connections 9, 10 to an input part 11 of the torsional vibration damper 8. The input part 11 of the torsional vibration damper 8 is essentially shaped like a radially-extending annular disc that forms a vibration damper cage radially outwardly. A starter ring gear 12 is attached radially to the outside of the input part 11. At least one energy storage mechanism, especially a spring device 16, is at least partially held by the vibration damper cage. An output part 18 of the vibration damper 8 engages the spring device 16. A slide ring/friction ring 19 is in between the input part 11 and the output part 18, and the ring is affixed to the input part 11. Between the output part 18 and a clutch housing part 22, is a biased diaphragm spring 20 to press the output part 18 of the torsional vibration damper 8 against the slide ring/friction ring 19.

Radially inwardly, the output part 18 of the torsional vibration damper 8 is releasably attached (i.e., it can be removed without being destroyed) to the clutch housing part 22. An intermediate pressure plate 26 is affixed to the clutch housing part 22 with the aid of rivets, of which only one rivet connection 24 can be seen in the sectional view. On the drive side, friction linings 29 of a first clutch disc 31 can be clamped between the intermediate pressure plate 26 and a first pressure plate 28. The first clutch disc 31 is tightly held via a hub 33 to a first transmission input shaft 35 that is designed as a solid shaft. The first transmission input shaft 35 is rotatably mounted within a second transmission input shaft 36 that is designed as a hollow shaft. A hub 38 is rotatably mounted on the input-side end of the second transmission input shaft 36 with the aid of a roller bearing 37, and the intermediate pressure plate 26 is radially affixed to the outside of the hub 38. On the transmission side, friction linings 40 of a second clutch disc 42 can be clamped between the intermediate pressure plate 26 and a second pressure plate 39. The second clutch disc 42 is non-rotatably connected via a hub 43 to second transmission input shaft 36.

The double clutch 6 has a clutch housing 44 to which the first and second axially movable pressure plates 28, 39 are non-rotatably mounted. In addition, the intermediate pressure plate 26 is affixed to the clutch housing 44. The clutch housing 44 is drivingly connected to the crankshaft 4 via the clutch housing part 22 and the torsional vibration damper 8. The double clutch 6 is actuated in a familiar manner via the actuation devices 46, 47 that interact with actuating levers 48, 49.

Figure 2:
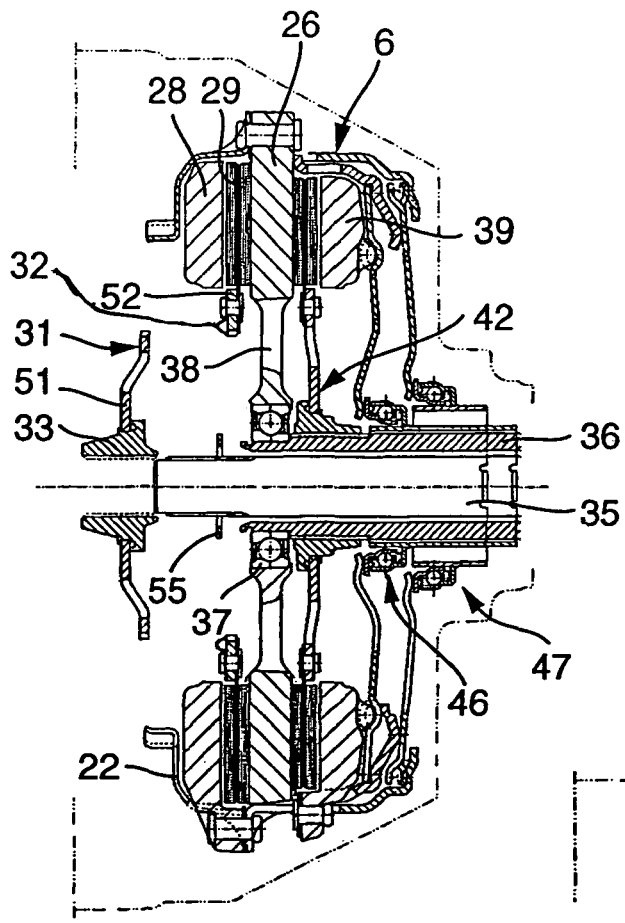
FIG. 2 is a longitudinal cross-sectional view of an assembled two-part clutch disk of the torque transmission device of FIG. 1.
Figure 3:
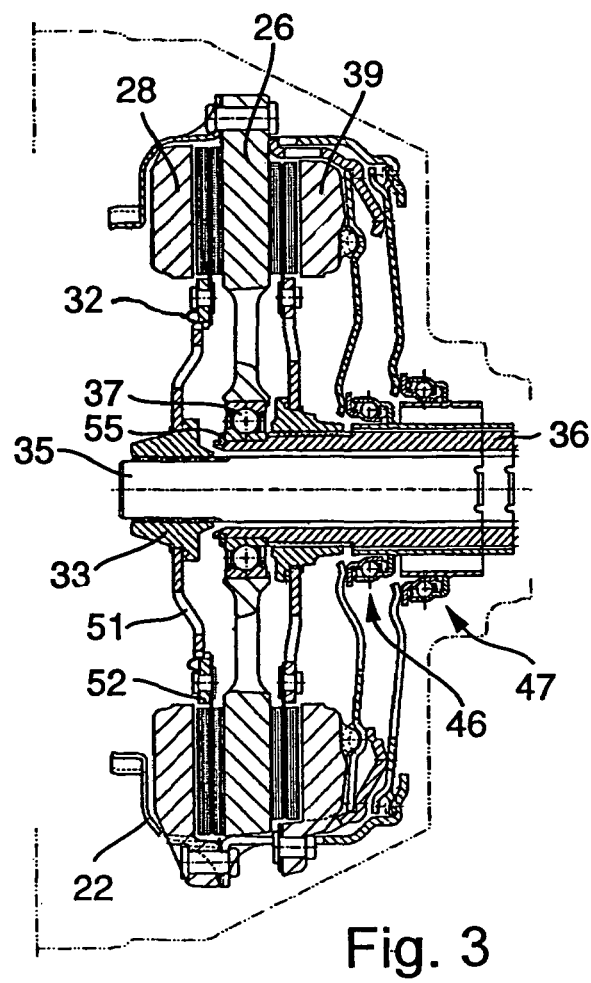
FIG. 3 is a longitudinal cross-sectional view of the torque transmission device of FIG. 1 before installing a torsional vibration damper.

FIG. 2 shows the double clutch 6 during assembly. The second clutch disc 42 and hub 38 with the intermediate pressure plate 26 and roller bearing 37 are pre-assembled on the transmission side. In addition, one can see in FIG. 2 that the first clutch disc 31 includes an inner flanged ring 51 attached to the hub 33, and an outer flanged ring 52 attached to the friction linings 29. Inner and outer rings 51, 52 are releasably connected by a fastening means, such as fastener 32, which is shown in FIGS. 1-3 as a fastening clip. In FIG. 2, the friction linings 29 with the outer flanged ring 52 and the first pressure plate 28 are pre-assembled on the input side. The hub 33 with the inner flanged ring 51 of the first clutch disc 31 is not mounted. In that state, a snap ring 55 can be attached to axially secure the roller bearing 37 to the transmission-side end of the second transmission input shaft 36. Then the hub 33 with the inner flanged ring 51 can be attached to the outer flanged ring 52.

FIG. 3 shows the first clutch disc 31 in an assembled state. In the next assembly step, the clutch housing part 22 is connected to the output part 18 of the torsional vibration damper 8.

Figure 4:
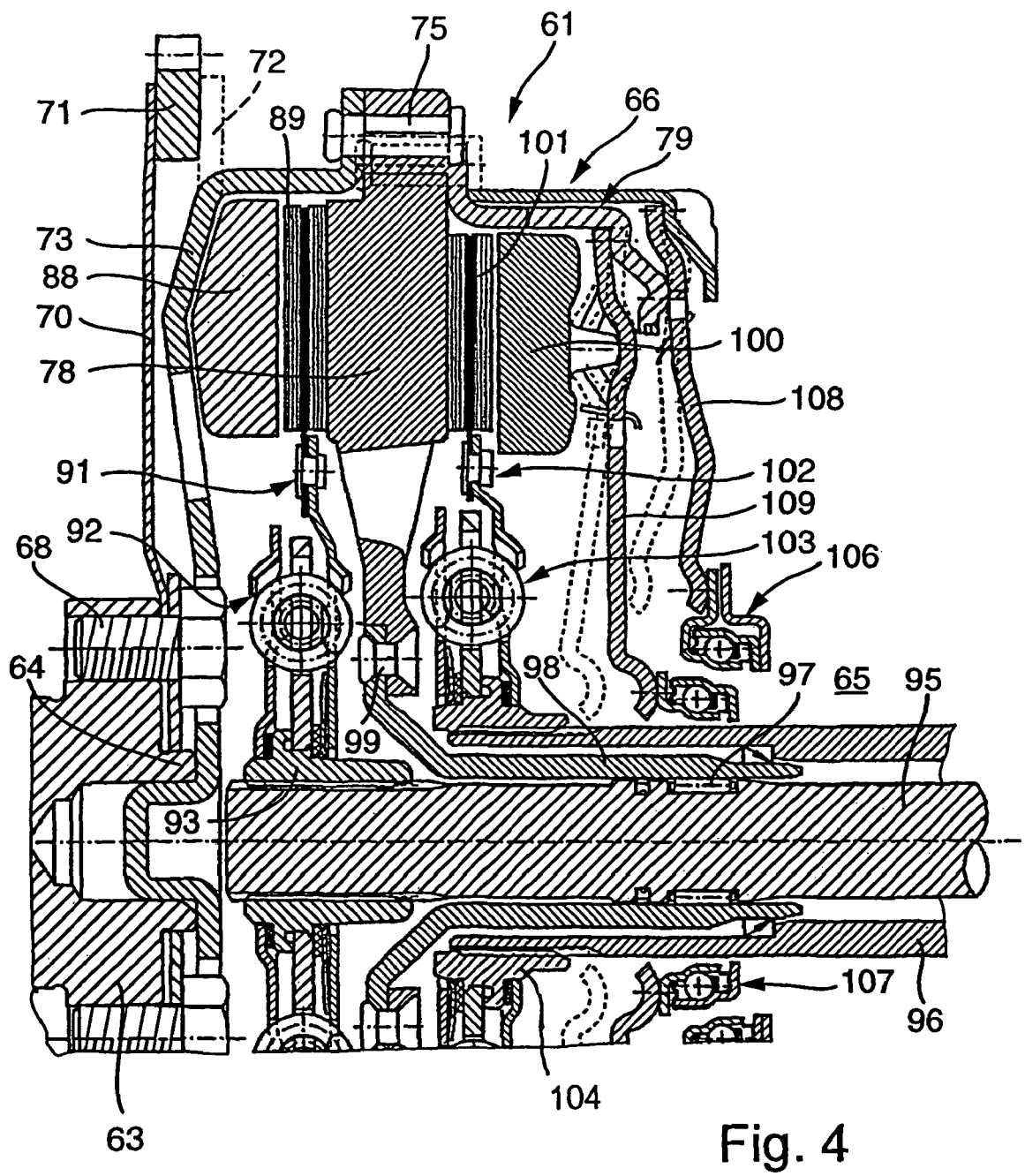
FIG. 4 is an enlarged, fragmentary, cross-sectional view of a torque transmission device with a so-called on-tube bearing.

FIG. 4 shows a part of a drive train 61 of an automobile. A double clutch 66 is between a drive unit 63 (especially an internal combustion engine) from which a crankshaft 64 extends, and a transmission 65. The crankshaft 64 of the internal combustion engine 63 is non-rotatably connected via screw connections 68 to a so-called flex plate 70. Radially outwardly a starter ring gear 71 is attached to the flex plate 70. Several vanes 72 extending from a carrier plate 73 are attached to the starter ring gear 71. The carrier plate 73 is securely connected to the crankshaft 64. Screw connections 75 affix an intermediate pressure plate 78 and a clutch housing part 79 radially to the outside of the carrier plate 73.

On the input side, friction linings 89 of a first clutch disc 91 can be clamped between the intermediate pressure plate 78 and a first pressure plate 88. The first clutch disc 91, through an intermediate torsional vibration damper 92, is coupled to a hub 93 that is non-rotatably connected to a first transmission input shaft 95. The first transmission input shaft 95 is designed as a solid shaft and is rotatably carried within a second transmission input shaft 96 that is designed as a hollow shaft.

A tubular hub 98 is rotatably mounted on the first transmission input shaft 95 by means of a needle bearing 97. The tubular hub 98 is between the two transmission input shafts 95 and 96. On the input side, the tubular hub 98 has a conically expanding region to which the intermediate pressure plate 78 is radially outwardly affixed by means of rivets 99.

On the transmission side, friction linings 101 of a second clutch disc 102 can be held between the intermediate pressure plate 78 and a second pressure plate 100. The second clutch disc 102 is coupled via a torsional vibration damper 103 to a hub 104 that is non-rotatably connected to the second transmission input shaft 96.

The two pressure plates 88 and 100 can move axially in a familiar matter with the aid of actuating devices 106, 107 and actuating levers 108, 109, relative to the intermediate pressure plate 78. The crankshaft 64 transmits torque to double clutch 66 via the carrier plate 73 and the flex plate 70. The tubular hub 98 is disposed radially between the two transmission input shafts 95 and 96 of the double clutch transmission.

Figure 5:
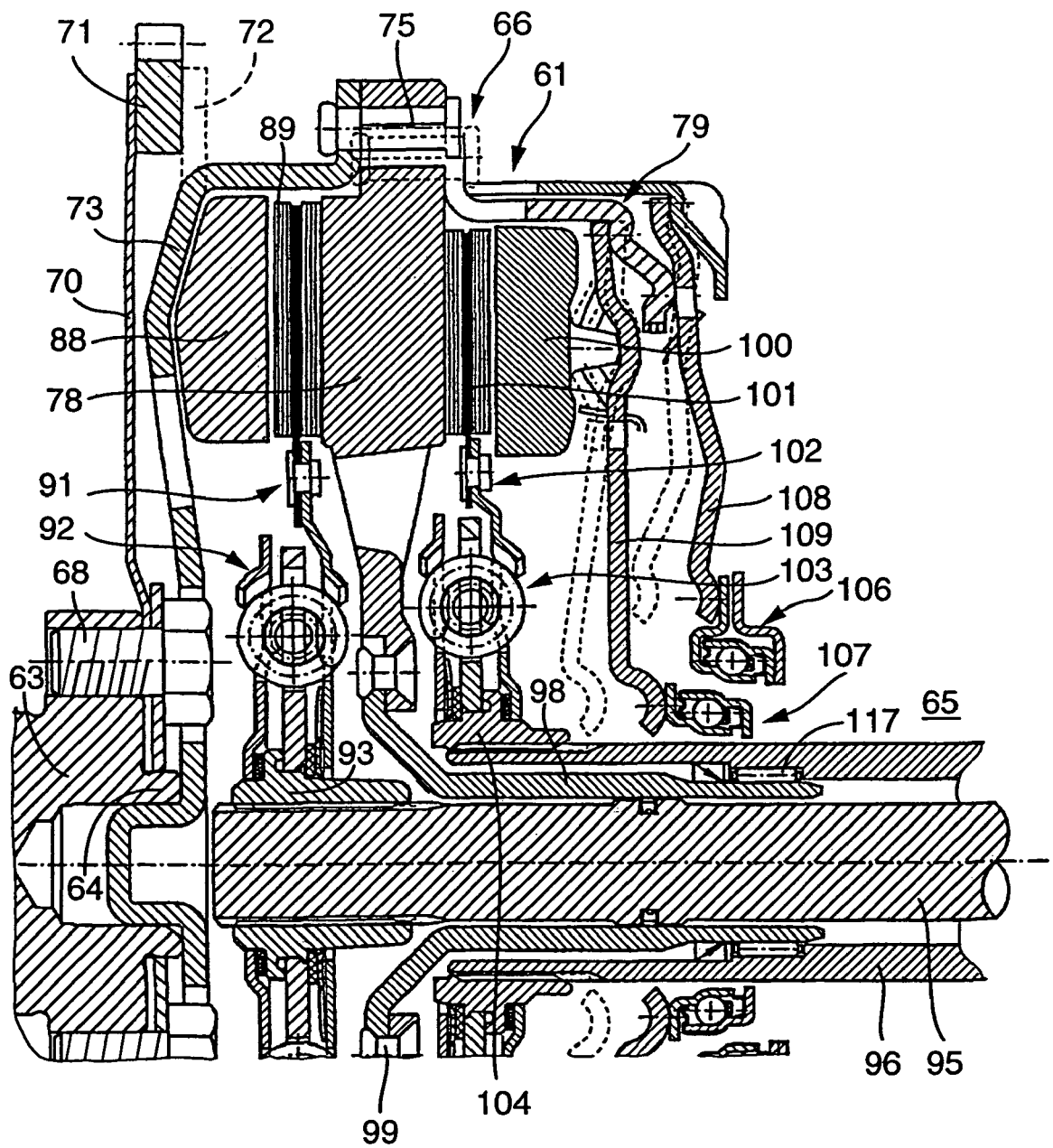
FIG. 5 is an enlarged, fragmentary, cross-sectional view of a torque transmission device with a so-called in-tube bearing.

The exemplary embodiment shown in FIG. 5 shows a similar torque transmission device as in FIG. 4. The same reference numbers are used as in FIG. 4 to designate the same parts in order to avoid repetition. The following will discuss the differences between the two exemplary embodiments.

In the exemplary embodiment shown in FIG. 4, the tubular hub 98 is rotatably supported on the solid shaft 95. In the exemplary embodiment shown in FIG. 5, the tubular hub 98 is rotatably supported within the hollow shaft 96 with the aid of a needle bearing 117.

In the exemplary embodiments shown in FIGS. 1 to 5, the engagement force is supported against the crankshaft when the double clutch is actuated. To increase rigidity, the carrier plate 73 in the exemplary embodiments in FIGS. 4 and 5 is preferably designed with conical surfaces and has air holes to ensure that the double clutch 66 is adequately cooled. To increase rigidity, the tubular hub 98 has a conical region in the transition section to the intermediate plate 78. The tubular hub 98 can be made of an inductively hardened or appropriate deep drawn sheet-metal part, or a corresponding forged part.

Figure 6:
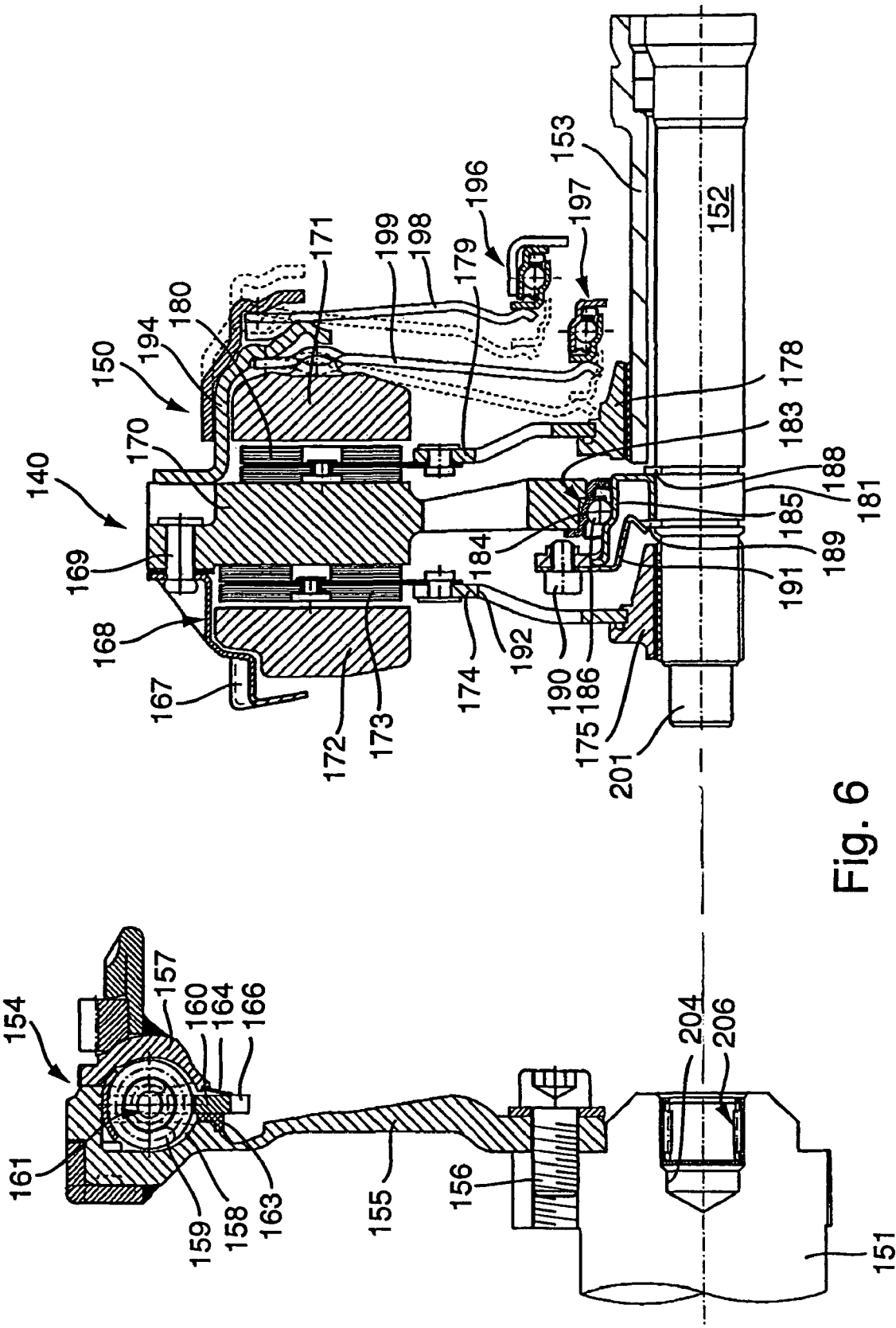
FIG. 6 is a longitudinal cross-sectional view of a torsional vibration damper of a torque transmission device and of an intermediate pressure plate axially abutting one of the transmission input shafts during assembly.

FIG. 6 shows a longitudinal section of a torque transmitting device that is also termed a clutch assembly 140. The clutch assembly 140 includes a double clutch 150 that connects a drive shaft 151, especially a crankshaft of an automobile engine, with two drivable shafts 152, 153, especially transmission input shafts, and can be separated from them. The double clutch 150 is connectable via a vibration damper 154 to the automobile engine, also termed an internal combustion engine. The torsional vibration fed by the crankshaft 151 to the damper 154 is at least substantially filtered so that it is at least not completely transmitted to the double clutch 150 or the transmission shafts 152, 153.

In regard to the basic design and function of the damper 154 that in this instance is a component of the so-called dual-mass flywheel, or forms a dual-mass flywheel, reference is made to DE OS 19728422, DE-OS 195 22 718, DE-OS 41 22 333, DE-OS 41 17 582, and DE-OS 41 17 579. The damper 154 includes an input part 155 that is securely connected via radially inner sections to the crankshaft 151, for example by means of screws 156. The input part 155 is formed by a shaped sheet-metal part that carries another component 157 radially outwardly, which component is also a shaped sheet-metal part in this instance. The two components 155 and 157 border an annular chamber 158 in which are held at least the energy storage mechanisms (helical springs 159 in this instance) of at least one damper. The chamber 158 is preferably sealed at least radially outwardly and contains at least a small quantity of a viscous medium that preferably is a lubricant. The torque introduced by the crankshaft 151 into the clutch assembly 140 is transmitted via the input part 155, 157 to the energy storage mechanism 159, and is conducted from there via an output part 160 that also engages the energy storage mechanisms 159 to the double clutch 150. The output part 160 is formed by a flange-like component that radially engages in the inside of the chamber and interacts via arms or fingers 161 with the end regions of the energy storage mechanisms 159.

A slide ring/friction ring 163 is arranged between the input part 155 and the output part 160, and the ring is affixed to the input part 155. Between the output part 160 and the component 157, there is a biased diaphragm spring 164 so that the output part 160 of the torsional vibration damper 154 is pressed against the slide ring/friction ring 163.

Radially inwardly, the output part 160 of the torsional vibration damper 154 includes internal teeth 166. The internal teeth 166 of the output part 160 are complementary with the external teeth 167 that are on a clutch housing part 168. The toothed arrangement is designed so that the torsional vibration damper 154 with the output part 160 can be inserted onto the coupling housing part 168 in an axial direction. The coupling housing part 168 is connected to an intermediate pressure plate 170 by the connections 169, of which only one rivet connection is shown in the cross-sectional view in FIG. 6. The intermediate pressure plate 170 interacts with pressure plates 171, 172 that are provided on the transmission side and on the drive side, respectively. Friction linings 173 that are attached radially outwardly to a first clutch disc 174 are between the intermediate pressure plate 170 and the pressure plate 172. The first clutch disc 174 is attached radially inwardly to a hub 175 that is firmly fixed to the first transmission shaft 152 and is designed as a solid shaft.

The solid shaft 152 that is also referred to as the first transmission input shaft is rotatably mounted within the second transmission input shaft 153 that is designed as a hollow shaft. A hub 178 to which a second clutch disc 179 is attached radially outwardly is non-rotatably carried on the input-side end of the second transmission input shaft 153. Radially affixed to the outside of the second clutch disc 179 are friction linings 180 that can be clamped between the intermediate pressure plate 170 and the second pressure plate 171.

The transmission shaft 152 that is designed as a solid shaft has a shaft section 181 between hub part 175 and hub part 178 on which a bearing device 183 is mounted for the intermediate pressure plate 170. The bearing device 183 includes a bearing outer race 184 that is affixed radially inwardly of the intermediate pressure plate 170, and a bearing inner race 185 that lies radially outwardly of shaft section 181. Rolling bodies 186 in the form of balls or rollers are positioned between the bearing inner race 185 and the bearing outer race 184. The bearing inner race 185 is axially secured by snap rings 188, 189 that fit in corresponding grooves of the solid shaft 152. The snap ring 189 is slotted and is also referred to as a locking ring. A retaining ring 191 is radially outwardly secured to the bearing inner race 185 by a screw 190; the retaining ring holds the locking ring 189 in an associated ring groove in the solid shaft 152.

FIG. 6 shows a pre-assembled clutch assembly 140. The torsional vibration damper 154 that is also referred to as a dual-mass flywheel is pre-assembled on the crankshaft 151. The double clutch 150 is pre-assembled on the first transmission input shaft 152 with the aid of the bearing device 183. The hubs 175, 178 are non-rotatably secured to the respective transmission shafts 152, 153. During assembly, the bearing device 183, and particularly the screw 190 for assembly and for axially securing the bearing device 183, are accessible from the outside through an opening 192 in the first clutch disc 174. The bearing device 183 is axially secured between the snap rings 188, 189 on the shaft section 181 of the first transmission shaft 152 using the screw 190 and the retaining ring 191. The flow of power is completed when the double clutch 150 is actuated given the axial support of the intermediate pressure plate 170 on the first transmission shaft 152.

The transmission input shafts 152, 153 are provided with helical teeth at the transmission side that enable the absorption of axial force. In accordance with one aspect of the present invention, the output part 160 of the dual-mass flywheel 154 is not centered by an additional bearing. In accordance with another aspect of the present invention, the bearing device 183 is at or near the center of gravity of the double clutch 150. That provides stable support for the double clutch 150 during transportation and assembly.

The double clutch 150 has a clutch housing 194 to which the intermediate pressure plate 170 is attached. The pressure plates 171, 172 are fixed to the clutch housing 194 in a manner that prevents rotation but allows axial movement. The clutch housing 194 can be non-rotatably connected to the crankshaft 151 by means of interengaging teeth 166, 167. The double clutch 150 is actuated in a familiar matter via the actuation devices 196, 197 that interact with actuating levers 198, 199.

On the input-side end of the first transmission shaft 152, there is a journal pin 201 that is received in a blind hole 204 in the transmission-side end of the crankshaft 151. A needle bearing 206, also referred to as a pilot bearing, is positioned within the blind hole 204.

Figure 7:
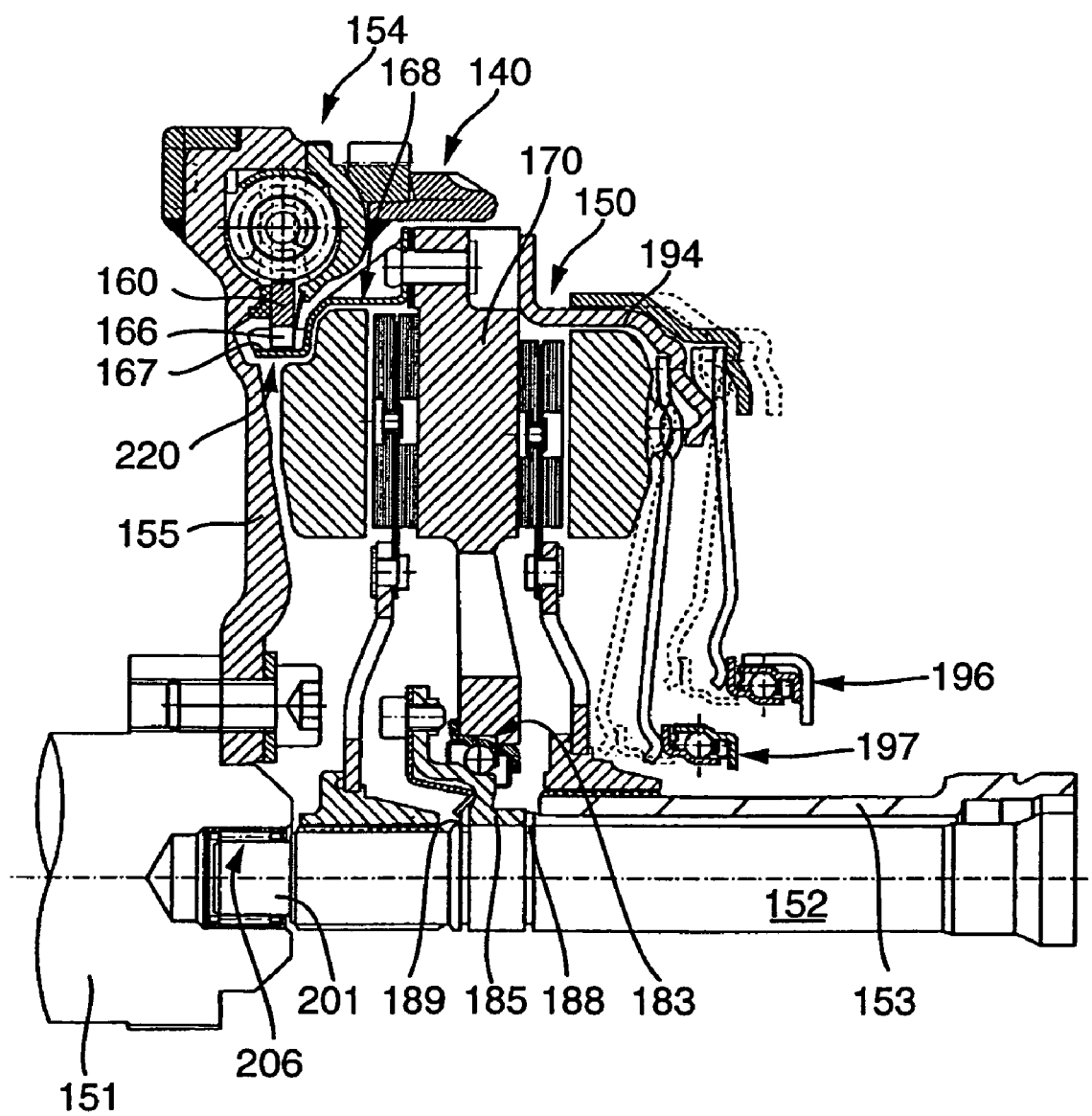
FIG. 7 is a longitudinal cross-sectional view of a torque transmission device as in FIG. 6 when assembled.

FIG. 7 shows an assembled torque transmission device 140 similar to the one shown in FIG. 6. For reasons of clarity, not all parts are provided with reference numbers. When assembled, the output part 160 of the dual-mass flywheel 154 is non-rotatably connected via its internal teeth 166 to the external teeth 167 of the coupling housing part 168. The connection is also referred to as an axial plug-in connection 220. When connecting the transmission to the engine, the connection of the double clutch 150 to the dual-mass flywheel 154 is made by the tooth arrangement 220. The output part 160 can also center the torsional vibration damper 154 (also termed the output flange) on the clutch housing part 168. A bearing, especially a radial bearing, is not necessary between the input part 155 and the output part 160 of the dual-mass flywheel 154. The tooth arrangement 220 allows an axial displacement that enables vibrations to be decoupled. The bearing device 183 is suitably positioned in relation to the center of gravity of the double clutch 150. When the double clutch 150 is assembled, the journal pin 201 of the first transmission shaft 152 is supported within the crankshaft 151 by the needle bearing 206. The bearing is also referred to as a pilot bearing and serves to improve the radial support of the clutch mass. The pilot bearing also reduces the radial offset of the transmission shaft 152 in relation to the crankshaft 151.

Figure 8:
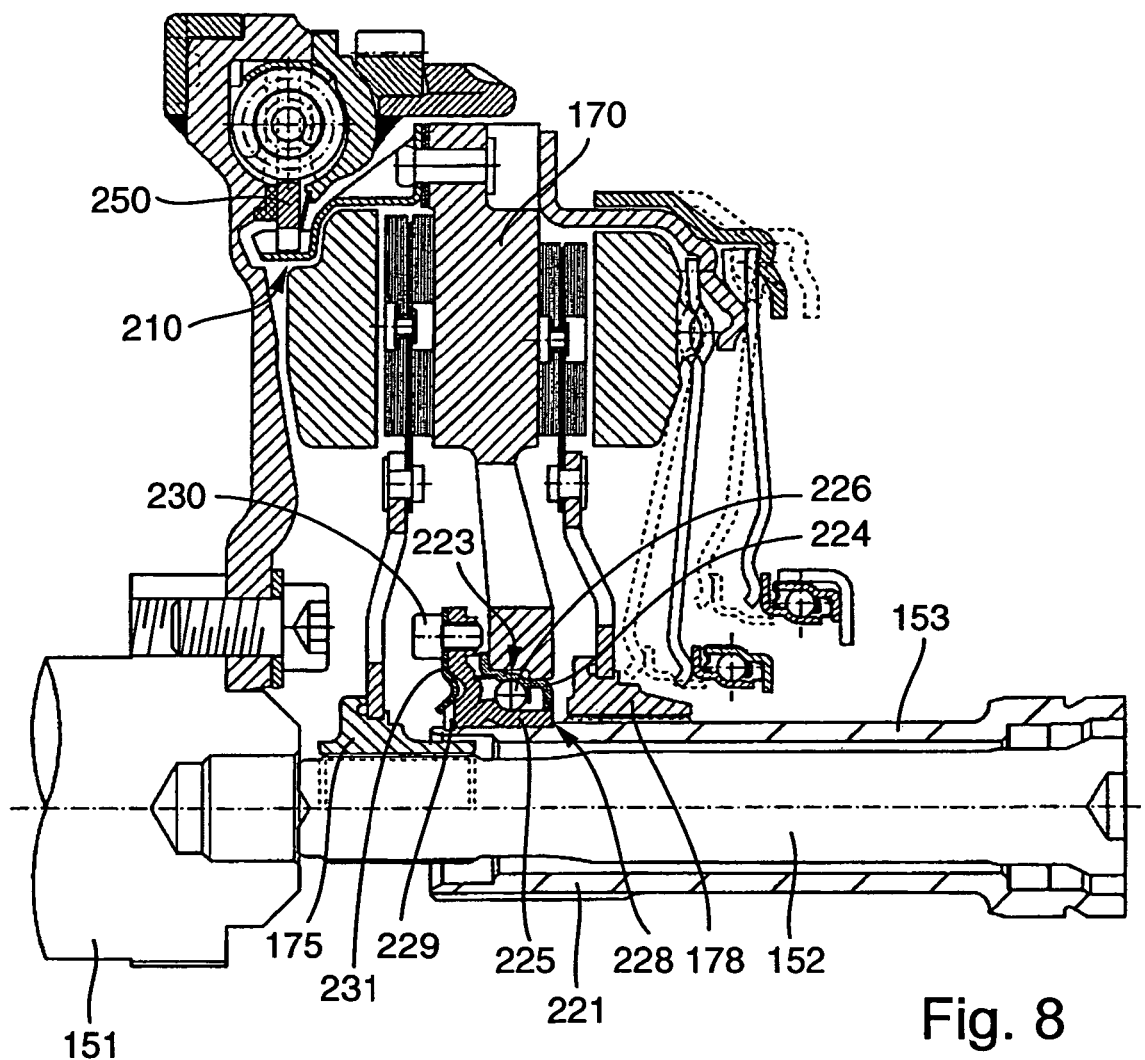
FIG. 8 is a longitudinal cross-sectional view as in FIG. 7, whereby the intermediate pressure plate is mounted on a transmission hollow shaft.

FIG. 8 shows a torque transmission device in accordance with another exemplary embodiment of the present invention. The same reference numbers are used to identify the same parts as were used in prior exemplary embodiments. For reasons of clarity, reference numbers not necessary for understanding are not included in FIG. 8. The following will discuss the differences between the individual exemplary embodiments.

In the exemplary embodiment in FIG. 8, the intermediate pressure plate is not supported on the first, solid transmission input shaft 152; instead, it is supported on the second, hollow transmission input shaft 153. The hollow second transmission shaft 153 has a shaft section 221 on its input-side end on which a bearing device 223 is mounted. The bearing device 223 has a bearing outer race 224 that is radially inwardly secured to the intermediate pressure plate 170. In addition, the bearing device 223 has a bearing inner race 225 that is radially outwardly arranged on the shaft section 221 of the hollow transmission shaft 153. Rolling bodies 226 are positioned between the bearing inner race 225 and the bearing outer race 224.

On the transmission side, the bearing inner race 225 is axially fixed at a step 228 on the second transmission input shaft 153. On the input side, the bearing inner race 225 is axially secured by a snap ring 229 that is also called a locking ring and is received in an annular groove in the second transmission input shaft 153. A retaining ring 231 is radially secured to the outside of the bearing inner race 225 by a screw 230; the retaining ring holds the snap ring 229 in the annular groove in the second transmission input shaft 153.

The hollow transmission input shaft 153 is preferably supported directly in a transmission housing (not shown). It can therefore enhance axial clutch support to position the double clutch on the hollow transmission input shaft 153. That serves to reduce axial play.

Figure 9:
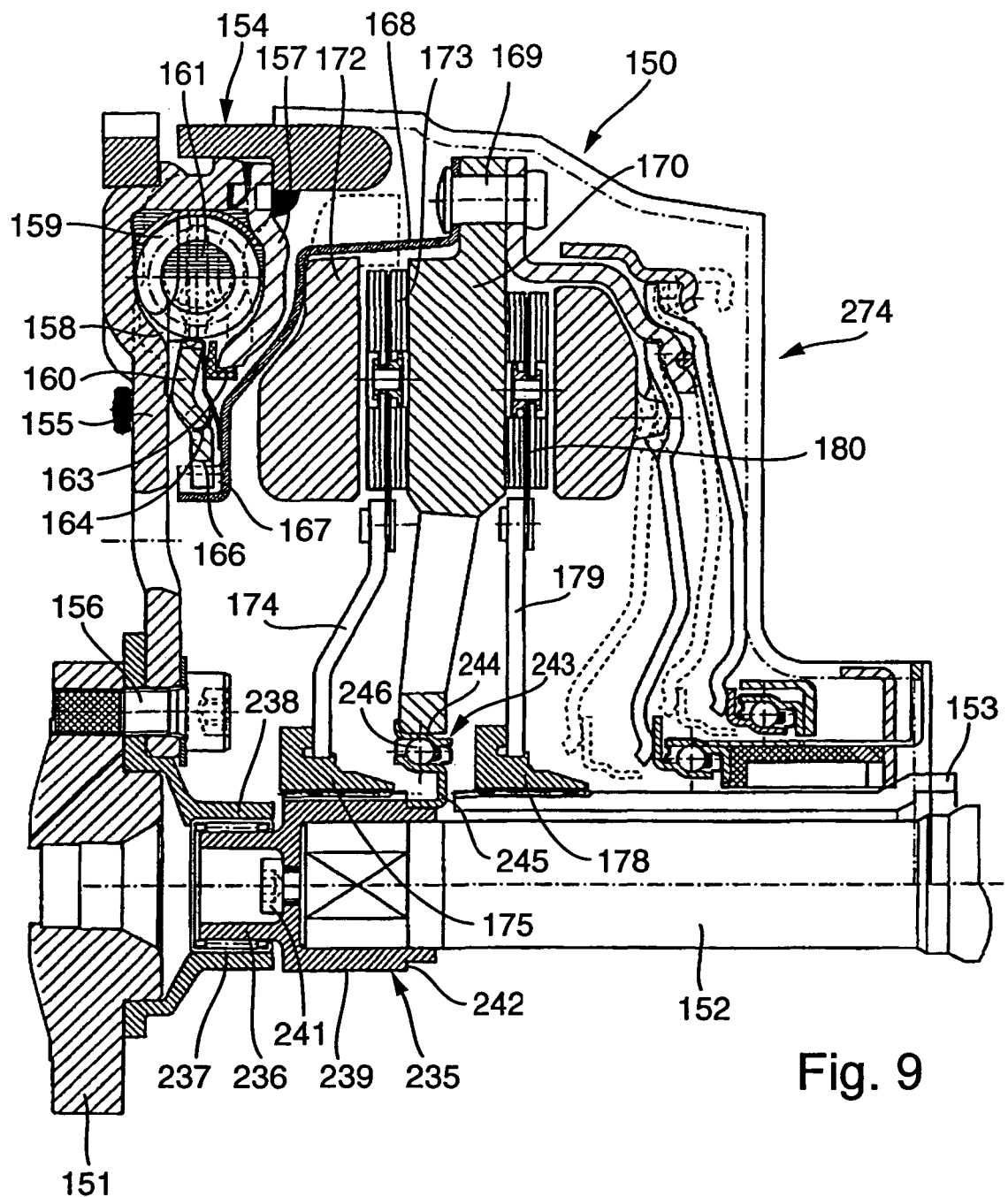
FIG. 9 is a longitudinal cross-sectional view of an embodiment in which the intermediate pressure plate is mounted on a hub bearing that is attached to the end of one of the transmission input shafts.

FIG. 9 shows an exemplary embodiment that is similar to the embodiments shown in FIGS. 6 and 7. The same reference numbers are used to identify the same parts. To avoid repetition, reference is made to the prior description of FIGS. 6 and 7. The following will only discuss the differences between the exemplary embodiments.

In the exemplary embodiment shown in FIG. 9, the clutch housing part 168 is moved further radially inward than in the prior exemplary embodiments. The internal teeth 166 of the output part 160 of the torsional vibration damper 154 and the external teeth 167 of the clutch housing part 168 are located in the region of the inner diameters of the friction linings 173, 180 of the double clutch 150.

In addition, the hub 175 in the exemplary embodiment in FIG. 9 is not directly mounted on the solid first transmission input shaft 152; rather, it is mounted on a hub bearing 235. The hub bearing 235 has essentially the shape of a circular cylinder sleeve section with the same outer diameter as the hollow second transmission input shaft 153. On the input-side end of the hub bearing 235, there is a bearing sleeve 236 that has a smaller outer diameter than the hub bearing 235. With the aid of a needle bearing 237 that is also referred to as a pilot bearing, the bearing sleeve 236 is rotatably mounted in a retaining element 238 that is affixed to the crankshaft 151 by the screws 156.

The circular cylinder sleeve section of the hub bearing 235 is also referred to as an attachment section 239. The attachment section 239 of the hub bearing 235 is non-rotatably connected radially inwardly of the hub 175 of the first clutch disc 174. The hub bearing 235 is secured to the input-side end of the solid first transmission input shaft 152 with a screw 241. The attachment section 239 of the hub bearing 235 has a step 242 on its transmission-side end. The step 242 axially positions a bearing device 243 for the intermediate pressure plate 170 on the solid first transmission input shaft 152. The bearing device 243 includes a bearing outer race 244 that is radially inwardly secured to the intermediate pressure plate 170. In addition, the bearing device 243 includes a bearing inner race 245 that is radially mounted on the outside of the transmission-side end of the hub bearing 235. The bearing inner race 245 axially abuts the step 242. Rolling bodies 245 are between the bearing inner race 244 and the bearing outer race 246.

The bearing device 243 can be pre-assembled and hence axially fixed on the hub bearing 235. While mounting the double clutch 150 in a bell housing 247, the hub bearing 235 is inserted onto the input-side end of the solid first transmission input shaft 152. The screw 241 for axially fixing the hub bearing 235 to the solid transmission input shaft 152 can be easily reached during assembly. The axial support for the clutch force is provided via the step 242 on the hub bearing 235.

The tight connection between hub 175 and hub bearing 235 also enables the transmission of torque between the clutch disc 174 and the solid transmission input shaft 152. It is particularly advantageous that the two clutch discs 174, 179 can have the same hub geometry due to the outer diameter of the attachment section 239.

Figure 10:
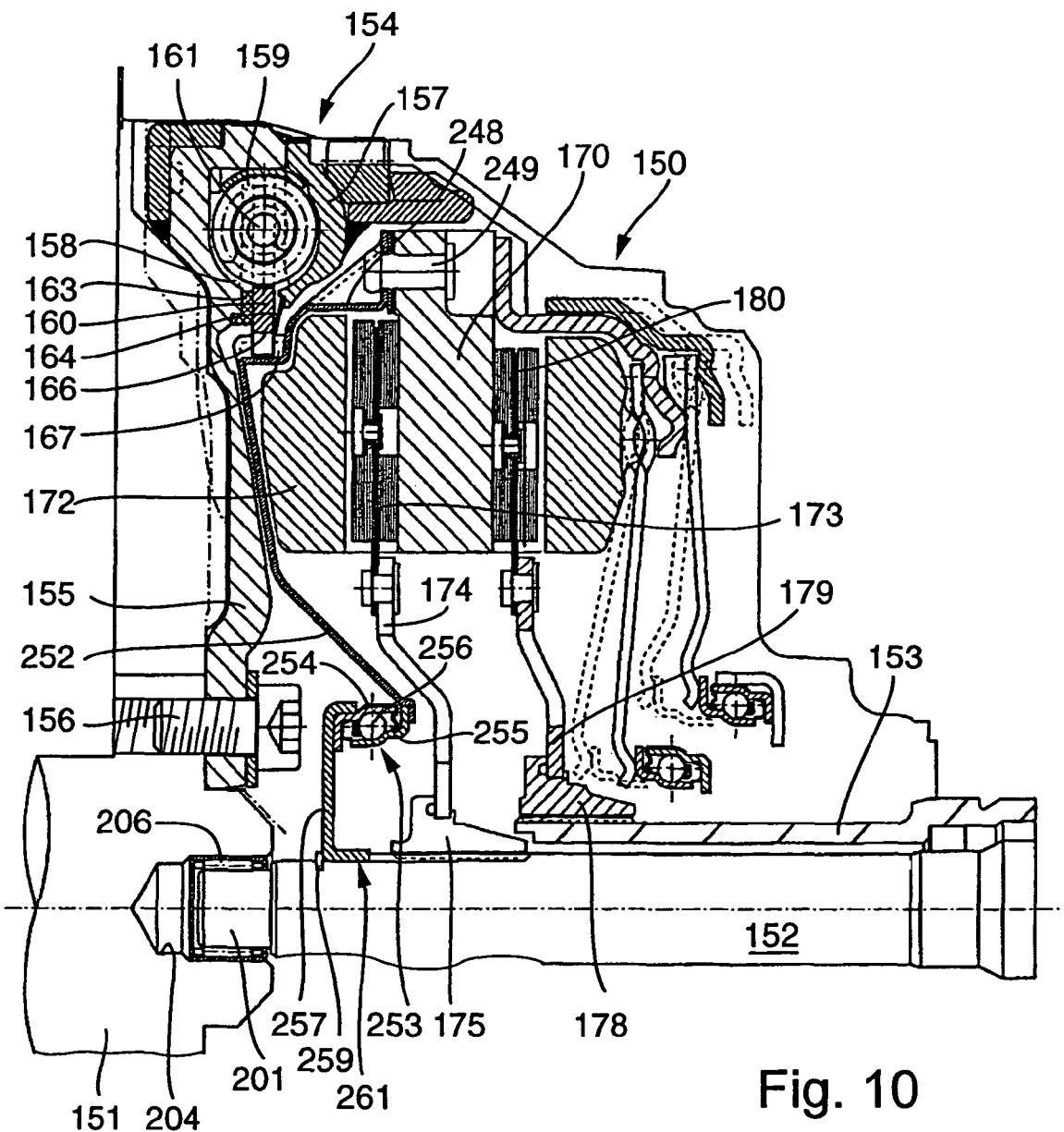
FIG. 10 is a longitudinal cross-sectional view of an embodiment in which the bearing of the intermediate pressure plate is offset from the input shaft.

FIG. 10 shows an exemplary embodiment that is similar to those of FIGS. 6 and 7. The same reference numbers are used to identify the same parts. To avoid repetition, reference is made to the prior description of FIGS. 6 and 7. The following will discuss the differences between the individual exemplary embodiments.

In the exemplary embodiment shown in FIG. 10, a clutch housing part 248 is affixed to the intermediate pressure plate 170, and the clutch housing part extends further radially inward than in the prior exemplary embodiments. Radially outwardly, the clutch housing part 248 is affixed to the intermediate pressure plate 170 with rivets 249. At the region of the pressure plate 172, the clutch housing part 248 is non-rotatably connected by the external teeth 167 to the internal teeth 166 of the damper output part 160. A connecting part 252 extends radially inwardly from the region of the clutch housing part 248 with the external teeth 167. The radial inner end of the connecting part 252 abuts the solid transmission input shaft 152 via a bearing device 253. The bearing device 253 includes a bearing outer race 254 and a bearing inner race 255. Rolling bodies 256 are positioned between the bearing inner race 255 and the bearing outer race 254. The bearing outer race 254 is affixed to a carrier ring 257 that is axially fixed to the crankshaft 151 by a snap ring 259 that is also referred to as a locking ring. On the side of the bearing device 255 facing the transmission, the hub 175 of the first clutch disc 174 is non-rotatably secured to the solid transmission input shaft 152. The bearing device 253 is on a shaft section 261 of the solid transmission input shaft 152 that lies between the journal pin 201 of the transmission input shaft 152 and the hub 175.

In the exemplary embodiment shown in FIG. 10, the bearing device 253 is arranged in front of the clutch disc hubs 175, 178 on the input side. That makes axial assembly location easier. The disadvantage of that arrangement is that the bearing device 253 is not optimally below the center of gravity of the double clutch 150.

Figure 11:
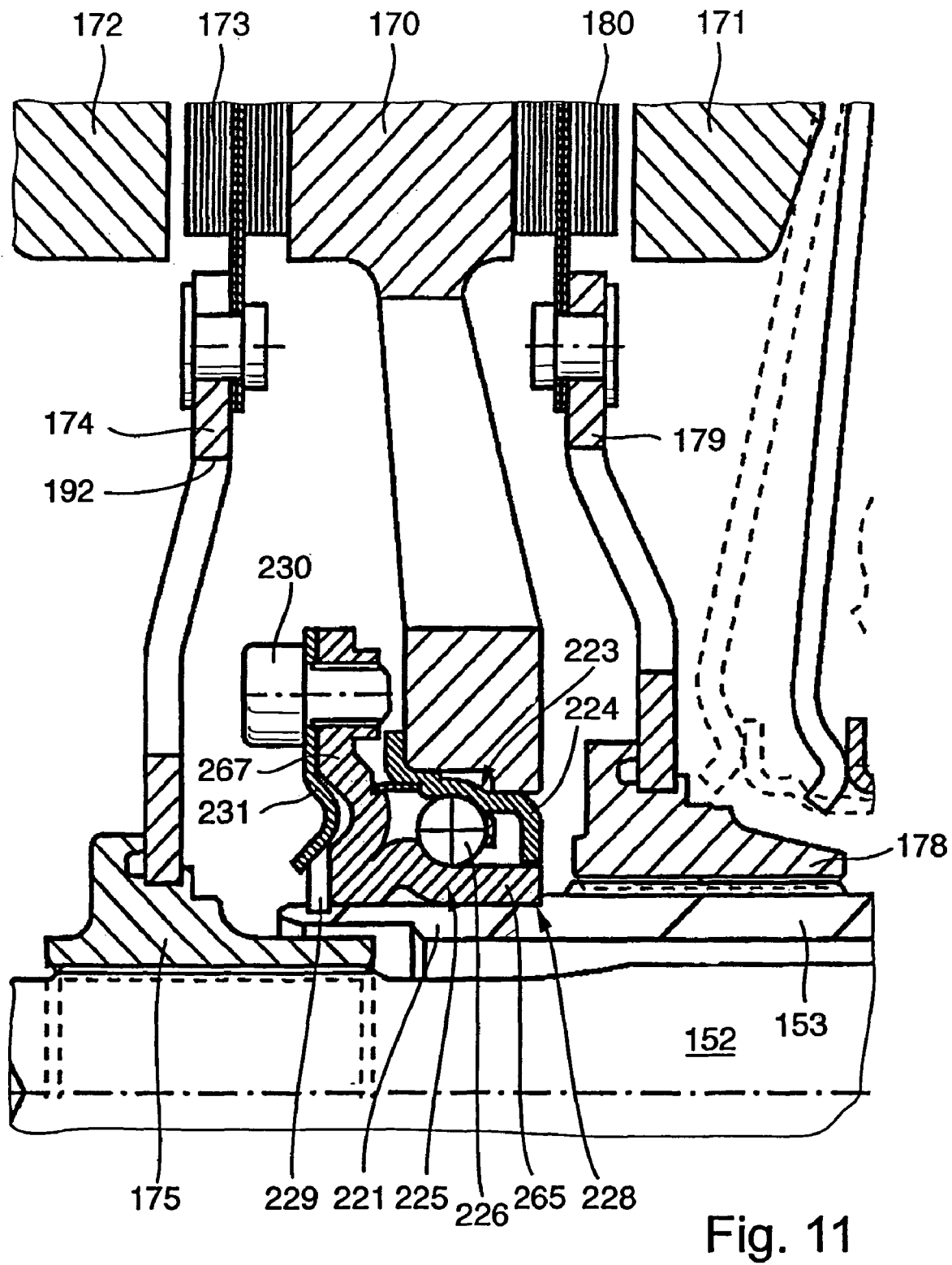
FIG. 11 is an enlarged, fragmentary cross section of the structure shown in FIG. 8.

In FIG. 11, the section with the bearing device 223 of FIG. 8 is shown enlarged. In FIG. 11, one can see that the bearing inner race 225 has an essentially circular cylinder sleeve section 265 that is axially fixed between the step 228 and the locking ring 229 on the input-side end of the hollow transmission input shaft 153. An attachment section 267 extends outward essentially in a radial direction from the input-side end of the sleeve section 265. The retaining ring 231 is secured with a screw 230 to the attachment section 267 that is joined as a single piece to the sleeve section 265.

In FIG. 11, it can be seen that the bearing device 223 includes bearing outer race 224, bearing inner race 225, and retaining ring 231 that are sheet metal parts. Before assembly, the screws 230, that are also termed locking screws, are loosened. That allows the retaining ring 231 to move axially, and allows the biased, slotted locking ring 229 to expand. When the double clutch with the bearing device 223 is inserted onto the hollow transmission input shaft 153, the locking screws 230 can then be tightened through the openings 192 in the first clutch disk 174. The radially internally conical retaining ring 231 compresses the locking ring 229 when the locking screws 230 are tightened so that the locking ring engages in the annular groove in the hollow transmission shaft 153. That secures the double clutch in an axial direction. When disassembling, the locking screws 230 must be loosened. The locking ring 229 then opens due to its bias. Depending upon the design, snap hooks or a bayonet ring can be used instead of the locking ring 229 to axially secure the bearing device 223. However, it must be ensured that the corresponding mounting sites (such as the openings 192) remain accessible from the outside during assembly.

Figure 12:
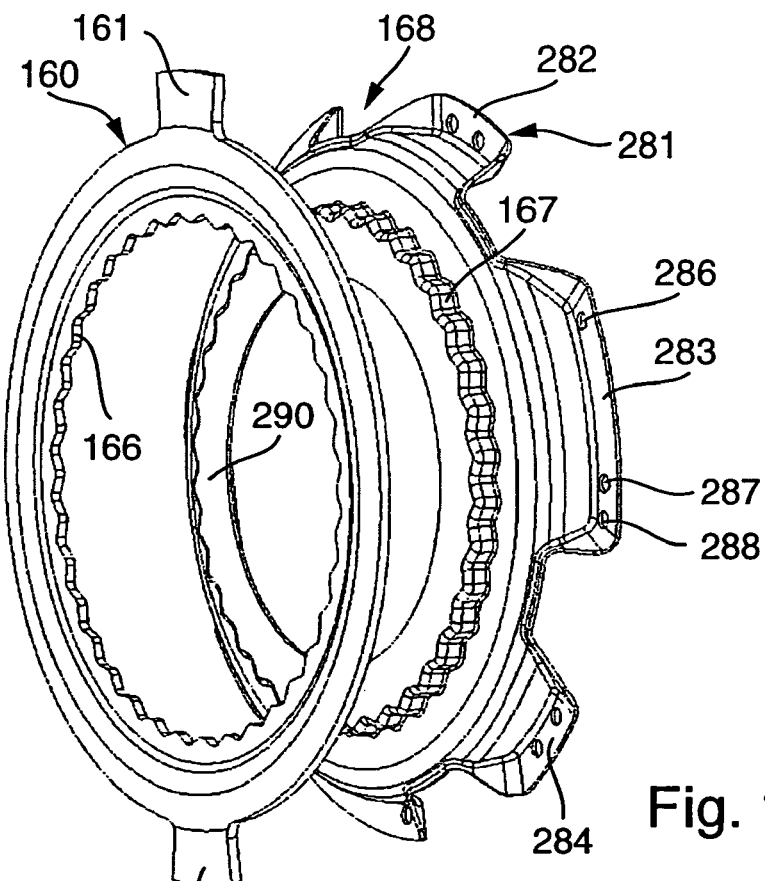
FIG. 12 is a perspective view of a damper output part that can be inserted onto a coupling housing part.

FIG. 12 shows a perspective view of a separated damper output part 160 with internal teeth 166 and a clutch housing part 168 with external teeth 167, as in the torque transmission devices shown in FIGS. 6 and 7. The damper output part 160, which is also referred to as a clutch flange, is designed as a sheet metal part. Radially outwardly, two diametrically opposed arms or fingers 161, 162 are on the damper output part 160. The internal teeth 166 and the external teeth 167 are provided with chamfers and roundings to facilitate assembly. The teeth are easily engaged during assembly, given the high number of teeth and equivalent tooth shape over the entire perimeter. To leave a large amount of installation space for the clutch on the clutch side of the flange, the damper output part 160 is narrow both axially and radially.

The clutch housing part 168 has a flanged region 281 on the transmission side that has several feet 282, 283, 284. There are several through-holes 286, 287, 288 in the feet for fasteners. The clutch housing part 168 has a radially-inwardly-extending reinforcing edge 290. The reinforcing edge 290 serves to minimize undesired deformation of the external teeth 167.

Figure 13:
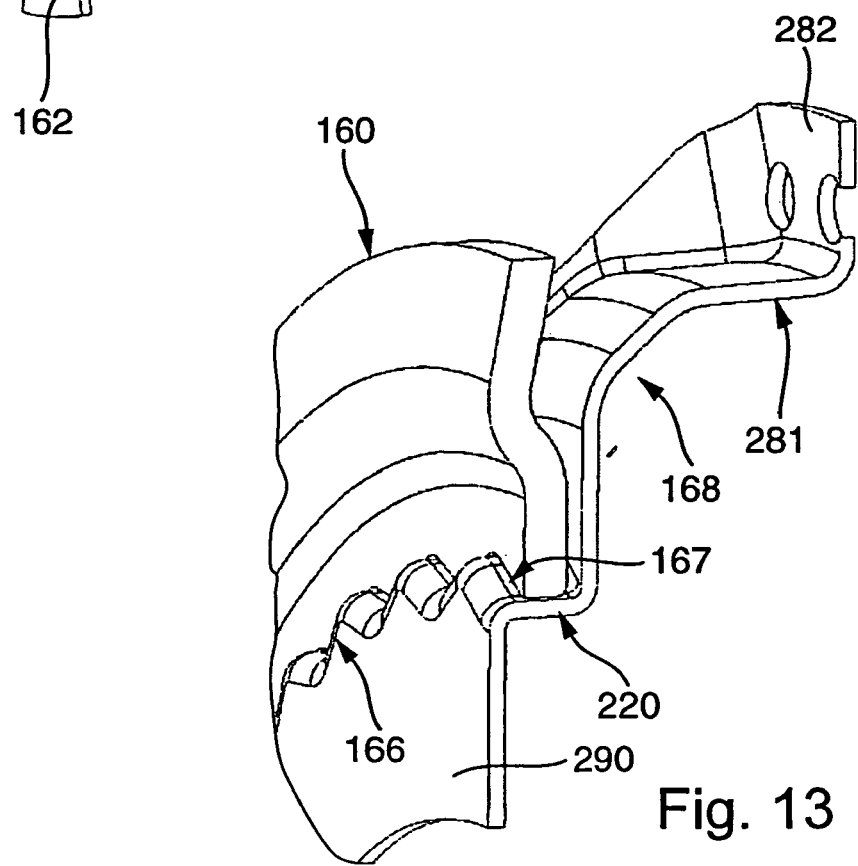
FIG. 13 is an enlarged fragmentary view of the connected parts shown in FIG. 12.

FIG. 13 shows an enlarged section of a portion of FIG. 12 where the internal teeth 166 of the damper output part 160 are engaged with the external teeth 167 of the clutch housing part 168. As can be seen in FIG. 13, the clutch housing part 168 with its external teeth can be axially inserted into the damper input part 160.

Figures 14, 15, 16:
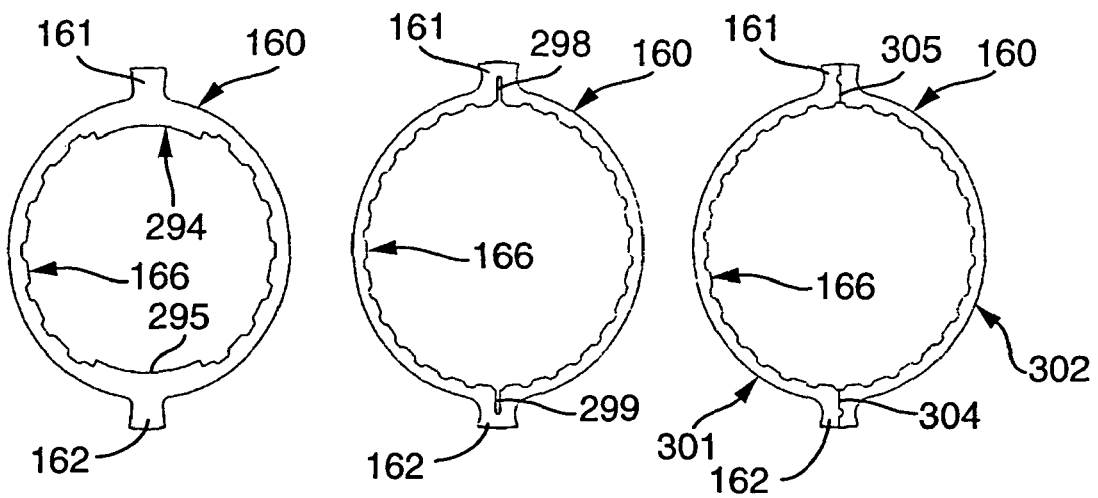
FIG. 14 is a plan view of a damper output part in accordance with another exemplary embodiment.
FIG. 15 is a plan view of a slotted variation of a damper output part.
FIG. 16 is a plan view of a two-part design of a damper output part.

FIGS. 14 to 16 show plan views of different exemplary embodiments of the damper output part 160. In all exemplary embodiments, two arms or fingers 161, 162 are diametrically opposed on the outside of the damper output part 160. In addition, the damper output part 160 is relatively thin in all three exemplary embodiments. When force is introduced through the arc-shaped springs of the dual-mass flywheel, there exists a tendency to bulge in a radial direction. By holding the damper output part 160 on the more rigid coupling housing part 168 (see FIG. 12), which is also termed the inner part, the extent of the deformation is kept within tolerable limits for the teeth.

In the exemplary embodiment shown in FIG. 14, the teeth 166 are not continuous; rather, there are also regions 294, 295 without teeth. The deformation behavior of the damper output part 160 can be enhanced by the regions 294, 295 without teeth.

In the exemplary embodiment in FIG. 15, radial inner slots 298, 299 are provided in the damper output part 160 in the region of the arms 161, 162. The slots 298, 299 extend radially but are not continuous. The slots 298, 299 make the damper output part 160 elastic. A biased variation of the tooth arrangement is thereby created without using additional parts. That can reduce wear and prevent noise.

FIG. 16 shows a damper output part 160 composed of two halves 301, 302 that are elastically connected at connecting sites 304, 305. That improves the flow of force in the damper output part 160. In addition, it can reduce deformation while the damper output part 160 is operating. The multi-part design of the dual-mass flywheel also makes it particularly economical to manufacture. When, for example, two peripherally symmetrical halves 301, 302 are combined, the parts can be produced from sheet metal with little stamping waste.

Figure 17:
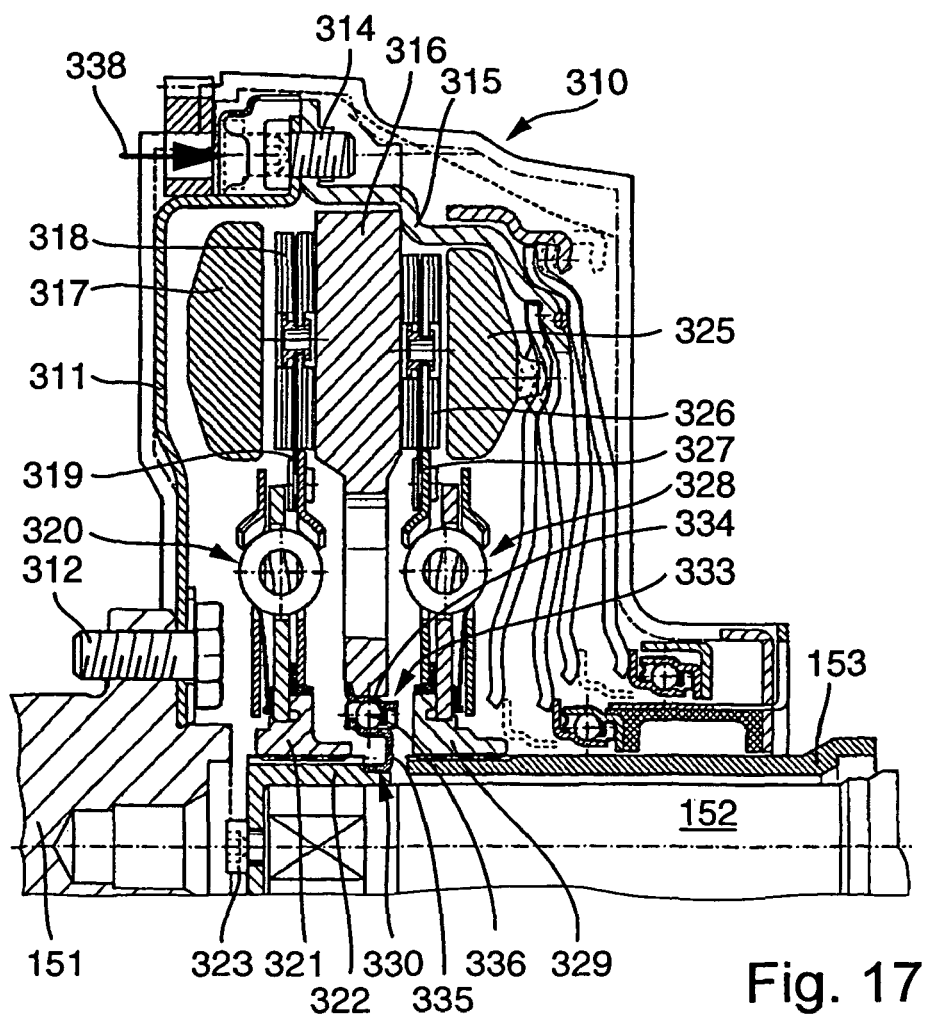
FIG. 17 is a longitudinal cross-sectional view of a torque transmission device in accordance with another exemplary embodiment in which the clutch discs of the double clutch are coupled via a separate damper to the associated transmission input shaft.

FIG. 17 shows an exemplary embodiment in which a double clutch 310 is coupled to a crankshaft 151 via a connecting part 311. Radially inwardly, the connecting part 311 is secured to the crankshaft 151 by screws 312. Radially outwardly, the connecting part 311 is secured to a clutch housing part 315 by screws 314. An intermediate pressure plate 316 is also secured to the clutch housing part 315 (the connection is not shown). On the input side, friction linings 318 of a first clutch disc 319 can be clamped between the intermediate pressure plate 316 and a first pressure plate 317. The first clutch disc 319 is coupled to a hub 321 of the first clutch disc 319 via a first vibration damper 320. The hub 321 is non-rotatably connected to a hub bearing 322 that is attached with a screw 323 to a transmission shaft 152 that is designed as a solid shaft.

On the transmission side, friction linings 326 of a second clutch disc 327 can be held between the intermediate pressure plate 316 and the second pressure plate 325. The second clutch disc 327 is coupled to a hub 329 by a second vibration damper 328, and the hub is non-rotatably mounted to the input-side end of hollow transmission input shaft 153.

The transmission-side end of the hub bearing 322 has a peripheral step 330 against which a bearing device 333 for the intermediate pressure plate 316 axially abuts. The bearing device 333 includes a bearing outer race 334 that is secured to a radially inner region of the intermediate pressure plate 316. In addition, the bearing device 133 includes a bearing inner race 335 that is radially mounted on the hub bearing 322. Rolling bodies 336 are positioned between the bearing inner race 335 and the bearing outer race 334.

In the exemplary embodiment in FIG. 17, there is no two-mass flywheel, in contrast to the prior exemplary embodiments. Given the substantial torque load, the connection between the double clutch 310 and the crankshaft 151 is not designed as a plug-in connection in this exemplary embodiment. The access to the screws 314 during assembly is indicated by an arrow 338. The double clutch 310 is connected to the crankshaft 151 via the connecting part 311 in the exemplary embodiment shown in FIG. 17.

In the exemplary embodiments shown in FIGS. 6 to 16, the actuating force of the double clutch is borne by the bearing device on one of the transmission input shafts. At the same time, the bearing device advantageously provides radial clutch support. The clutch can be pre-mounted in the bell housing. The two-mass flywheel can be pre-mounted on the crankshaft.

The connection to the clutch is made during assembly with a toothed arrangement. The toothed arrangement axially decouples the clutch from the crankshaft vibration. The required radial balancing of the clutch in relation to the crankshaft is provided by the mobility of the damper output part in the two-mass flywheel. The damper output part with the internal teeth is centered by the clutch housing part with the external teeth, and it can be aligned at its contact sites with the parts of the two-mass flywheel.

What is claimed is:

1. A torque transmission device for a drive train of a motor vehicle including a drive unit having a drive shaft and including a double clutch to transmit torque, said torque transmission device comprising: a transmission having a first, internally hollow transmission input shaft and a second transmission input shaft that is rotatably mounted within the first transmission shaft, wherein the transmission input shafts are non-rotatably connected to respective first and second clutch discs of the double clutch, each clutch disc having a friction lining, an intermediate pressure plate between the friction linings of the first clutch disc and the friction linings of the second clutch disc for connection of one of the clutch discs of the double clutch unit to the drive shaft of the drive unit, wherein the intermediate pressure plate extends radially outwardly of the internally hollow transmission input shaft, whereby the friction linings of the clutch discs are positioned between the intermediate pressure plate and pressure plates associated with the respective clutch discs that each move with the assistance of a respective actuation device in an axial direction relative to the intermediate pressure plate in reference to the transmission input shafts in order to operate the clutches, wherein one of the clutch discs attached to a transmission input shaft is a two-part structure that includes an inner part and an outer part that are coaxial relative to each other, wherein the intermediate pressure plate is mounted on a hub bearing that is releasably affixed to the drive-side end of the second transmission input shaft and that carries a radial bearing on which the intermediate pressure plate is supported, and wherein the double clutch is pre-mounted in a clutch housing as a sub-assembly that is axially releaseably engageable with an output element of a torsional vibration damper having an input element connected with the drive unit.

2. A torque transmission device according to claim 1, wherein one of the clutch discs is securely connected to the hub bearing.

3. A torque transmission device for a drive train of a motor vehicle including a drive unit having a drive shaft and including a double clutch to transmit torque, said torque transmission device comprising: a transmission having a first, internally hollow transmission input shaft and a second transmission input shaft that is rotatably mounted within the first transmission shaft wherein the transmission input shafts are non-rotatably connected to respective first and second clutch discs of the double clutch, each clutch disc having a friction lining, an intermediate pressure plate between the friction linings of the first clutch disc and the friction linings of the second clutch disc for selective operative connection of each of the clutch discs of the double clutch unit to the drive shaft of the drive unit by frictional engagement of the friction linings of a respective clutch disc with the intermediate pressure plate, wherein the intermediate pressure plate is mounted on a radial bearing carried on the internally hollow transmission input shaft and wherein the intermediate pressure plate extends radially outwardly of the internally hollow transmission input shaft, whereby the friction linings of the clutch discs are positioned between the intermediate pressure plate and pressure plates associated with the respective clutch discs that each move with the assistance of a respective actuation device in an axial direction relative to the intermediate pressure plate and relative to the transmission input shafts in order to operate the clutches, wherein at least one of the clutch discs attached to a transmission input shaft is a two-part structure that includes an inner part and an outer part that are coaxial relative to each other, and wherein the double clutch is pre-mounted in a clutch housing as a sub-assembly that is axially releaseably engageable with an output element of a torsional vibration damper having an input element connected with the drive unit, wherein the radial bearing includes a bearing outer race that radially engages a radially inner annular surface of the intermediate pressure plate, and a bearing inner race that radially engages an outer surface of the internally hollow transmission input shaft, and wherein the bearing inner race includes a cylindrical sleeve section that has a radially inward surface that engages an outer surface of the internally hollow transmission input shaft so that a transmission-side end of the cylindrical sleeve section lies against a radially extending step formed on the internally hollow transmission input shaft.

4. A torque transmission device according to claim 3, wherein the cylindrical sleeve section includes an attachment section that extends radially outwardly from a drive-side end of the cylindrical sleeve section to which a retaining snap ring is releasably affixed.

5. A torque transmission device according to claim 4, wherein the retaining ring is fixed with a screw to the attachment section of the bearing inner race.

6. A torque transmission device according to claim 5, wherein the retaining ring has a radially inner conical fixing section that exerts a holding force on a locking ring when the screw is tightened, thereby causing the locking ring to engage an annular groove that is provided in the internally hollow transmission input shaft.

7. A torque transmission device according to claim 6, wherein the locking ring is slotted and is pretensioned for insertion into the annular groove in the internally hollow transmission input shaft.

8. A torque transmission device according to claim 6, wherein the bearing outer race, the bearing inner race, the retaining ring and the locking ring are formed from sheet metal.

* * * * *